United States Patent [19]
Halvorsen

[11] 3,865,023
[45] Feb. 11, 1975

[54] KITCHEN APPLIANCE FOR SKIMMING FAT

[76] Inventor: Harold W. Halvorsen, 600 16th St. 106, Silver Spring, Md.

[22] Filed: Apr. 18, 1973

[21] Appl. No.: 352,285

[52] U.S. Cl. .................... 99/495, 99/444, 141/331, 141/375, 210/83, 210/514
[51] Int. Cl. ............................................. A47j 43/28
[58] Field of Search ........ 99/495, 496, 504; 210/83, 210/513, 514, 515, 516, 517, 518, 519; 141/331, 375

[56] References Cited
UNITED STATES PATENTS

| | | | |
|---|---|---|---|
| 2,583,335 | 1/1952 | Jepson | 210/514 X |
| 2,661,844 | 12/1953 | Kolbet | 210/514 |
| 2,795,334 | 6/1957 | Wickland | 99/496 UX |
| 2,807,290 | 9/1957 | Hearn | 141/375 |
| 3,308,953 | 3/1967 | Hinshaw | 210/83 |

Primary Examiner—Henry K. Artis
Attorney, Agent, or Firm—Laurence R. Brown

[57] ABSTRACT

In order to separate fat from the top of soup or broth or perform other similar kitchen chores, upper and lower vessels are provided with a valve control arrangement in the upper vessel to control the leakage of the heavier component out of the bottom of the vessel into the lower vessel.

To provide simple control in a sanitary environment that may be readily cleaned the upper vessel has its bottom slightly coned or funnelled toward a center hole and a tapered rod is inserted into the hole to seal it. Thus the rod, which extends out of the upper vessel may be manually manipulated to control the speed and depth of separation, thus controlling turbulence.

1 Claim, 3 Drawing Figures

PATENTED FEB 11 1975 3,865,023
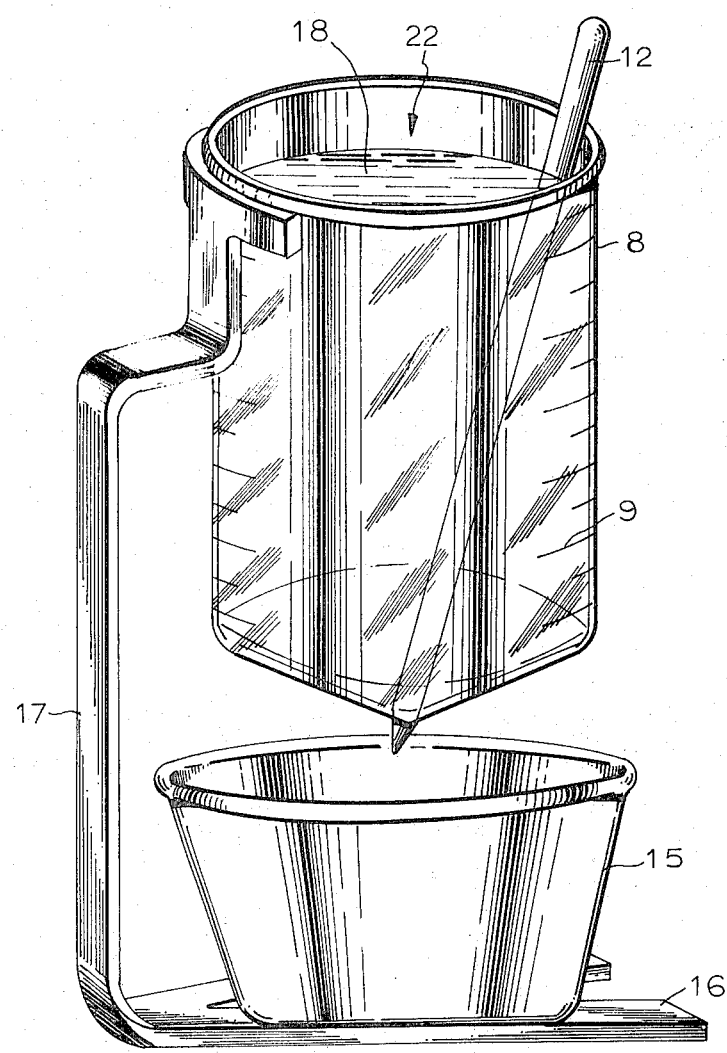
FIG. 1
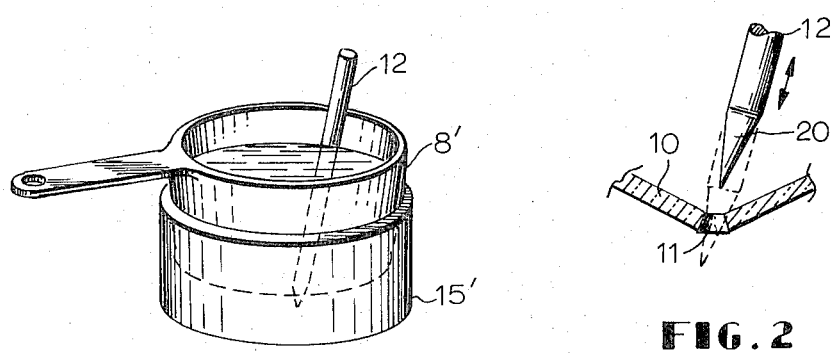
FIG. 3                    FIG. 2

KITCHEN APPLIANCE FOR SKIMMING FAT

This invention relates to kitchen appliances, and more particularly it relates to apparatus for separating two ingredients of different weight such as cream from milk or fat from soup.

While it is known that lighter ingredients such as cream or fat rises to the top of a mixture by force of gravity and can be skimmed off or pumped off by a syringe, such chores in the kitchen are tedious and sometimes use implements that are not easily sanitized, such as small diameter syringe funnels or valve arrangements.

It is therefore an object of this invention to provide an improved sanitary and easy-to-use appliance for skimming off lighter ingredients from cooling mixtures such as fat from soup.

Therefore in accordance with the invention there is provided an upper dispensing vessel with a tapered bottom leading to a central hole plugged with a conically ended rod that can be manipulated to leak the lower ingredients of the upper vessel into a lower receptacle vessel.

Further objects, features and advantages of the invention will be set forth throughout the following more detailed description of preferred embodiments of the invention, which makes reference to the accompanying drawing, wherein FIG. 1 shows a perspective view of an embodiment of the invention with an upper dispensing vessel mounted on a stand adapted to receive a lower receptacle vessel, FIG. 2 is a fragmental view, partly in section of the dispensing valve arrangement afforded by this invention, and FIG. 3 is a further embodiment of the invention wherein the dispensing and receptacle vessels are arranged in double-boiler fashion.

Referring now to the embodiment of FIGS. 1 and 2, it is seen that the upper dispensing vessel 8 is transparent and preferably of "Pyrex" or other glass that can receive hot soup or the like. Graduation markings 9 on the side may be included. The bottom 10 of the vessel is cone shaped with a central hole 11 into which a pointed rod 12 is mated to block seapage until manually manipulated to release the contents of the upper dispensing vessel 8 into the lower receptacle vessel 15 placed upon the foot portion 16 of stand 17 holding dispensing vessel 8 in the uppermost position.

One problem with separating two cooking ingredients, such as egg yolks and whites, cream and milk or soup and fat is the creation of turbulence which will tend to mix the ingredients and prevent complete separation. Thus any valving arrangement must be capable of slowly seeping off the lower portion of contents of dispensing vessel 8 at least at the critical boundary between the upper and lower ingredients that have settled out by force of gravity into separate layers. Generally the ingredients are liquid or semi-liquid as indicated at 18 in the vessel 8, but may include solid particles such as vegetables in soup. Thus, the hole 11 is large enough to pass the solid particles when the pointed section 20 of the rod 12 is withdrawn as shown in FIG. 2.

The rod 12 may be glass, or plastic and the bottom 10 at the hole 11 and the rod are shaped to seal the hole against leakage when the rod 12 rests therein as shown in FIG. 1. For this purpose the pointed tip 20 of rod 12 may have a rubberized or plastic coating, or the rod may be of a "Teflon" or other plastic substance that will withstand cooking temperatures up to that of boiling and yet present a sealing resiliency.

It is seen that the degree of withdrawal of the rod 12 will control the turbulence of the ingredients and when a thin layer of fat, for example, on top of a broth moves down in transparent vessel 8 near the bottom 10, the rod 12 may be reinserted into hole 11 to that extent desirable to prevent turbulence and mixing and therefore efficiently separate two layered ingredients. This structure permits such delicate operations as separating yolks from white of eggs, for example.

A further problem with cooking utensils is sanitary problems of cleaning. Thus the opening 22 of the upper vessel 8 is large enough to reach a hand into for cleaning out, and the valve arrangement is such that no foodstuffs can escape into crevaces or pockets of a conventional valve or spigot, etc. Also the rod 12 is removable and easily sanitized.

Accordingly an easy-to-use and efficient sanitary implement is provided for accomplishing the kitchen chores of separating two ingredients.

As seen in FIG. 3, the same principle may be used in a double boiler type arrangement with upper and lower vessels 8' and 15' where the lower vessel 15' in essence replaces the stand 17. While it is preferable to have transparent at least upper vessel 8 to visually gage the behavior and placement of the boundary zone between two ingredients, it may not be necessary in all cases and metal vessels such as shown in FIG. 3, may be useful in separating egg yolks from whites, or soup from fat, which may be viewed from the top of vessel 8 adequately to achieve the desired separation.

Having thus shown an improved appliance useful in the kitchen to separate two ingredients separable by force of gravity or by physical characteristics such as yolk and egg or vegetables and broth where liquids may be seeped out from the solid ingredients by means of the novel valving arrangement which permits easy sanitation, those novel features believed descriptive of the nature and scope of the invention are set forth with particularity in the appended claims.

What is claimed is:

1. A cooking vessel for separating two ingredients comprising a dispensing vessel having a tapered bottom leading toward a centrally disposed aperture through which the contents may pass by force of gravity, a removable plug-like element with a tapered end fitting partly into said aperture to seal the vessel bottom against leakage of the contents, the plug-like element having structure so that it may be manually manipulated to release only a distinguishable part of the ingredients of the vessel through said aperture, and means fixedly mounting said dispensing vessel in an uppermost position over a receptacle vessel so that the dispensing vessel is held still and is adapted to discharge its contents into the second vessel when said plug-like element is manipulated with a single hand.

* * * * *